United States Patent [19]

Webster

[11] Patent Number: 5,479,531
[45] Date of Patent: Dec. 26, 1995

[54] APPARATUS AND METHOD FOR PROVIDING A WEIGHTED AVERAGE OF TIME VARYING CHARACTERISTIC OF HANDWRITING

[75] Inventor: John R. Webster, Derby, England

[73] Assignee: Rolls-Royce plc, London, England

[21] Appl. No.: 167,805

[22] PCT Filed: Apr. 28, 1991

[86] PCT No.: PCT/GB92/00779

§ 371 Date: Dec. 10, 1993

§ 102(e) Date: Dec. 10, 1993

[87] PCT Pub. No.: WO92/00659

PCT Pub. Date: Jan. 7, 1993

[30] Foreign Application Priority Data

Jun. 21, 1991 [GB] United Kingdom .................. 9113458

[51] Int. Cl.⁶ .................................................. G06K 9/00
[52] U.S. Cl. .......................................... 382/119; 382/187
[58] Field of Search .................................. 382/3, 13, 24, 382/119, 187, 202, 120, 121, 122, 123

[56] References Cited

U.S. PATENT DOCUMENTS

| | | | |
|---|---|---|---|
| 3,956,734 | 5/1976 | Radcliffe, Jr. | 340/146.3 |
| 3,991,402 | 11/1976 | Radcliffe, Jr. | 340/146.3 |
| 4,040,010 | 8/1977 | Crane et al. | 340/146.3 |
| 4,345,239 | 8/1982 | Elliot | 340/146.3 |
| 4,718,102 | 1/1988 | Crane et al. | 382/13 |
| 4,731,845 | 3/1988 | Matsuki et al. | 381/43 |
| 5,029,219 | 7/1991 | Cox | 382/3 |
| 5,040,222 | 8/1991 | Muroya | 382/3 |

FOREIGN PATENT DOCUMENTS

| | | | |
|---|---|---|---|
| 0042490 | 12/1981 | European Pat. Off. | G06K 9/22 |
| 0391044 | 10/1990 | European Pat. Off. | G06K 9/62 |
| 0442208 | 8/1991 | European Pat. Off. | G07C 9/00 |
| 2159998 | 11/1985 | United Kingdom | A61B 5/00 |

OTHER PUBLICATIONS

IBM Technical Disclosure Bulletin, vol. 17, No. 12, May 1975 New York US pp. 3758–3760; Evangelisti: 'Identification System' see p. 3760, Line 26, Line 30.

Proc. Of The 6th Int. Conf. On Pattern Recognition vol. 2, 19 Oct. 1982, Munich, DEX. pp. 823–825; Sato E. A.: "Online Signature Verification Based on Shape, Motion, and Writing Pressure", see p. 824, col. 1, Line 19–col. 2, Line 37; see p. 825, col. 1, Line 15–32 see figures.

*Primary Examiner*—Joseph Mancuso
*Assistant Examiner*—Bipin Shalwala
*Attorney, Agent, or Firm*—Cushman Darby & Cushman

[57] ABSTRACT

The stress wave activity produced during a first generation of a piece of handwriting in an enrollment procedure is put into a store and the stress wave activities produced for subsequent generations of the piece of handwriting in the enrollment procedure are used sequentially to produce a weighted average of the stored stress wave activity and the stress wave activity of the subsequent generation of the piece of handwriting and replaces the stored stress wave activity; the weighted average includes a weighted average of amplitudes and times of events. For subsequent generations of the piece of the handwriting are resequenced in order of increasing difference from the respective stored stress wave activity. The subsequent generations of the piece of handwriting are again used to sequentially produce weighted averages and replace the stored stress wave activity. The subsequent generations of the piece of handwriting are again resequenced in order of increasing difference from the respective stored stress wave activity. Each of the four subsequent generations of the piece of handwriting are used to produce weighted averages and replace the stored stress wave activity if the difference from the respective stored stress wave activity is less than a predetermined value.

17 Claims, 2 Drawing Sheets

APPARATUS AND METHOD FOR PROVIDING A WEIGHTED AVERAGE OF TIME VARYING CHARACTERISTIC OF HANDWRITING

FIELD OF THE INVENTION

The present invention relates to an apparatus and method for verifying personal handwriting.

BACKGROUND OF THE INVENTION

It is known from British Patent No. 2159998B to detect and store a time varying characteristic, e.g. the stress wave activity produced in a body by a writing instrument during the generation of a given piece of handwriting. The time varying characteristic, e.g. the stress wave activity, produced by a subsequent generation of the given piece of handwriting is compared with that produced by the stored piece of handwriting in order to determine whether the stored and subsequent handwriting pieces have a common author.

In our copending European Patent Application No. 90313505.1, filed on 12 Dec. 1990, if it is determined that the subsequent and stored time varying characteristic produced during the generation of the handwriting pieces have a common author, a weighted average of the stored time varying characteristic and the subsequent time varying characteristic is produced. The stored time varying characteristic is then replaced by the weighted average of the stored time varying characteristic and the subsequent time varying characteristic produced during the generation of a piece of handwriting by a common author. The weighted average is a weighted average of the magnitudes of the time varying characteristic between the stored time varying characteristic and the time distorted subsequent time varying characteristic and is a weighted average of the time of events.

In this procedure it is necessary that the stored time varying characteristic is either produced from a single sample piece of handwriting of the author generated during an enrollment procedure, or is an average produced from a number of sample pieces of handwriting of the author generated during an enrollment procedure.

A problem associated with the production of the stored time varying characteristic is that the single sample piece of handwriting of the author, or one or more of the number of sample pieces of handwriting of the author, is often not a typical piece of handwriting of the author. This is often because the author is not relaxed during the enrollment procedure, or is because the author is not used to writing or for other reasons. If the time varying characteristic produced from the untypical sample of the piece of handwriting, or untypical samples of the piece of handwriting, is stored and subsequently compared to the time varying characteristic produced by an authentic piece of handwriting it is possible that the authentic piece of handwriting will be determined to be generated by a person other than the author of the stored time varying characteristic, i.e the piece of handwriting will be determined to be a forgery.

SUMMARY OF THE INVENTION

The present invention seeks to provide a novel apparatus and method for verifying personal handwriting which overcomes the above problem.

Accordingly the present invention provides a method of verifying personal handwriting comprising the steps of detecting a time varying characteristic produced by the motion of a writing instrument on a surface of a body during the generation of a given piece of handwriting, storing random noise or the time varying characteristic produced by the motion of the writing instrument on the surface of the body during a first generation of the piece of handwriting by an author at an enrollment procedure to produce a stored time varying characteristic, sequentially producing a weighted average of the stored time varying characteristic and the time varying characteristic produced by the motion of the writing instrument on the surface of the body during each one of a plurality of subsequent generations of the piece of handwriting by the author at said enrollment procedure and replacing the stored time varying characteristic with the weighted average of the stored time varying characteristic and the time varying characteristic produced by the motion of the writing instrument on the surface of the body during the said one of the subsequent generations of the piece of handwriting by the author at the enrollment procedure, characterised in that the step of sequentially producing a weighted average includes comparing the stored time varying characteristic and the time varying characteristic produced by the motion of the writing instrument on the surface of the body during each one of the plurality of subsequent generations of the piece of handwriting by the author at the enrollment procedure to give a measure of the difference, resequencing the time varying characteristics of the plurality of subsequent generations of the piece of handwriting by the author at the enrollment procedure in order of increasing difference from the respective stored time varying characteristic, sequentially producing a weighted average of the stored time varying characteristic and the time varying characteristic produced by the motion of the writing instrument on the surface of the body for each of the resequenced plurality of subsequent generations of the piece of handwriting by the author at the enrollment procedure and replacing the stored time varying characteristic with the average of the stored time varying characteristic and the time varying characteristic produced by the motion of the writing instrument on the surface of the body during said one subsequent generation of the piece of handwriting by the author at the enrollment procedure if the difference is less than a predetermined value to produce an average of the time varying characteristic produced by the motion of the writing instrument on the surface of the body from the subsequent generations of the piece of handwriting by the author at the enrollment procedure.

Preferably the method further comprises the step of determining if a predetermined number of the plurality of subsequent generations of the piece of handwriting have a difference from the stored time varying characteristic equal to or greater than the predetermined value and aborting the enrollment procedure if the predetermined number is equalled or exceeded.

Preferably, after resequencing the time varying characteristics of the plurality of subsequent generations of the piece of handwriting and before sequentially producing and storing the weighted average of the stored time varying characteristic and the time varying characteristic produced by the motion of the writing instrument on the surface of the body for each one of the subsequent generations of the handwriting piece if the difference is less than a predetermined value, sequentially producing a weighted average of the stored time varying characteristic and the time varying characteristic produced by the motion of the writing instrument on the surface of the body during each one of the plurality of subsequent generations of the piece of handwriting by the author at said enrollment procedure and replacing the stored time varying characteristic with the weighted average of the stored time varying characteristic and the time varying characteristic produced by the motion of the writing instrument on the surface of the body during the said one of the subsequent generations of the piece of handwriting by the author at the enrollment procedure, resequencing the time varying characteristics of the plurality of subsequent generations of the piece of handwriting by the author at the enrollment procedure in order of increasing difference from the respective stored time varying characteristic.

Preferably comparing the stored time varying characteristic with the time varying characteristic produced by the motion of the writing instrument on the surface of the body includes distorting the time varying characteristic in time to obtain a best match with the stored time varying characteristic and storing the value of time distortion required to obtain the best match.

Preferably producing a weighted average of the stored time varying characteristic and the time varying characteristic produced by the motion of the writing instrument on the surface of the body includes distorting the time varying characteristic in time by the values stored to obtain the best match with the stored time varying characteristic, producing weighted average magnitudes of the time varying characteristic between the stored time varying characteristic and the time distorted time varying characteristic produced by the motion of the writing instrument on the surface of the body and producing weighted average of time of events by displacing the weighted average magnitudes of the time varying characteristic in time towards the time varying characteristic produced by the motion of the writing instrument on the surface of the body.

Preferably the time varying characteristic is stress wave activity. The time varying characteristic may be capacitance, load, pressure, velocity or acceleration.

The present invention also provides an apparatus for verifying personal handwriting comprising means for detecting a time varying characteristic produced by the motion of a writing instrument on a surface of a body during the generation of a given piece of handwriting, means for storing random noise or the time varying characteristic produced by the motion of the writing instrument on the surface of the body during the first generation of the piece of handwriting by an author at an enrollment procedure to produce a stored time varying characteristic, means for sequentially producing a weighted average of the stored time varying characteristic and the time varying characteristic produced by the motion of the writing instrument on the surface of the body during each one of a plurality of subsequent generations of the piece of handwriting by the author at said enrollment procedure and for replacing the stored time varying characteristic with the weighted average of the stored time varying characteristic and the time varying characteristic produced by the motion of the writing instrument on the surface of the body during the said one of the subsequent generations of the piece of handwriting by the author at the enrollment procedure the means for sequentially producing a weighted average includes means for comparing the stored time varying characteristic and the time varying characteristic produced by the motion of the writing instrument on the surface of the body during each one of the plurality of subsequent generations of the piece of handwriting by the author at the enrollment procedure to give a measure of the difference, means for resequencing the time varying characteristics of the plurality of subsequent generations of the piece of handwriting by the author at the enrollment procedure in order of increasing difference from the respective stored time varying characteristic, second means for sequentially producing a weighted average of the stored time varying characteristic and the time varying characteristic produced by the motion of the writing instrument on the surface of the body for each of the resequenced plurality of subsequent generations of the piece of handwriting by the author at the enrollment procedure and replacing the stored time varying characteristic with the average of the stored time varying characteristic and the time varying characteristic produced by the motion of the writing instrument on the surface of the body during said one subsequent generation of the piece of handwriting by the author at the enrollment procedure if the difference is less than a predetermined value to produce an average of the time varying characteristic produced by the motion of the writing instrument on the surface of the body from the subsequent generations of the piece of handwriting by the author at the enrollment procedure.

Preferably the apparatus further comprises means for determining if a predetermined number of the plurality of subsequent generations of the piece of handwriting have a difference from the stored time varying characteristic equal to or greater than the predetermined value and for aborting the enrollment procedure if the predetermined number is equalled or exceeded.

Preferably the apparatus comprises third means for sequentially producing a weighted average of the stored time varying characteristic and the time varying characteristic produced by the motion of the writing instrument on the surface of the body for each one of the plurality of subsequent generations of the piece of handwriting by the author at said enrollment procedure resequenced by the means for resequencing the time varying characteristics of the plurality of subsequent generations of the piece of handwriting and replacing the stored time varying characteristic with the weighted average of the stored time varying characteristic and the time varying characteristic produced by the motion of the writing instrument on the surface of the body during the said one of the subsequent generations of the piece of handwriting by the author at the enrollment procedure, second means for resequencing the time varying characteristics of the plurality of subsequent generations of the piece of handwriting by the author at the enrollment procedure in order of increasing difference from the respective stored time varying characteristic.

Preferably the means for comparing the stored time varying characteristic with the time varying characteristic produced by the motion of the writing instrument on the surface of the body distorts the time varying characteristic in time to obtain a best match with the stored time varying characteristic and stores the value of time distortion required to obtain the best match.

Preferably the means for producing a weighted average of the stored time varying characteristic and the time varying characteristic produced by the motion of the writing instrument on the surface of the body is arranged to distort the time varying characteristic in time by the values stored to obtain the best match with the stored time varying characteristic, and is arranged to produce weighted average magnitudes of the time varying characteristic between the stored time varying characteristic and the time distorted time varying characteristic produced by the motion of the writing instrument on the surface of the body and is arranged to produce a weighted average of time of events by displacing the weighted average magnitudes of the time varying characteristic in time towards the time varying characteristic produced by the motion of the writing instrument on the surface of the body.

Preferably the means for detecting the time varying characteristic is an acoustic emission transducer for detecting the stress wave activity produced by the motion of the writing instrument on the surface of the body.

The means for detecting the time varying characteristic may be a capacitor defined between the writing instrument and the surface of the body, the time varying characteristic is capacitance.

The means for detecting the time varying characteristic may be a load cell for detecting load, or pressure, produced by the motion of the writing instrument on the surface of the body.

BRIEF DESCRIPTION OF THE DRAWINGS

The present invention will be more fully described by way of example with reference to the accompanying drawings, in which.

DETAILED DESCRIPTION OF THE INVENTION

Figure 1:
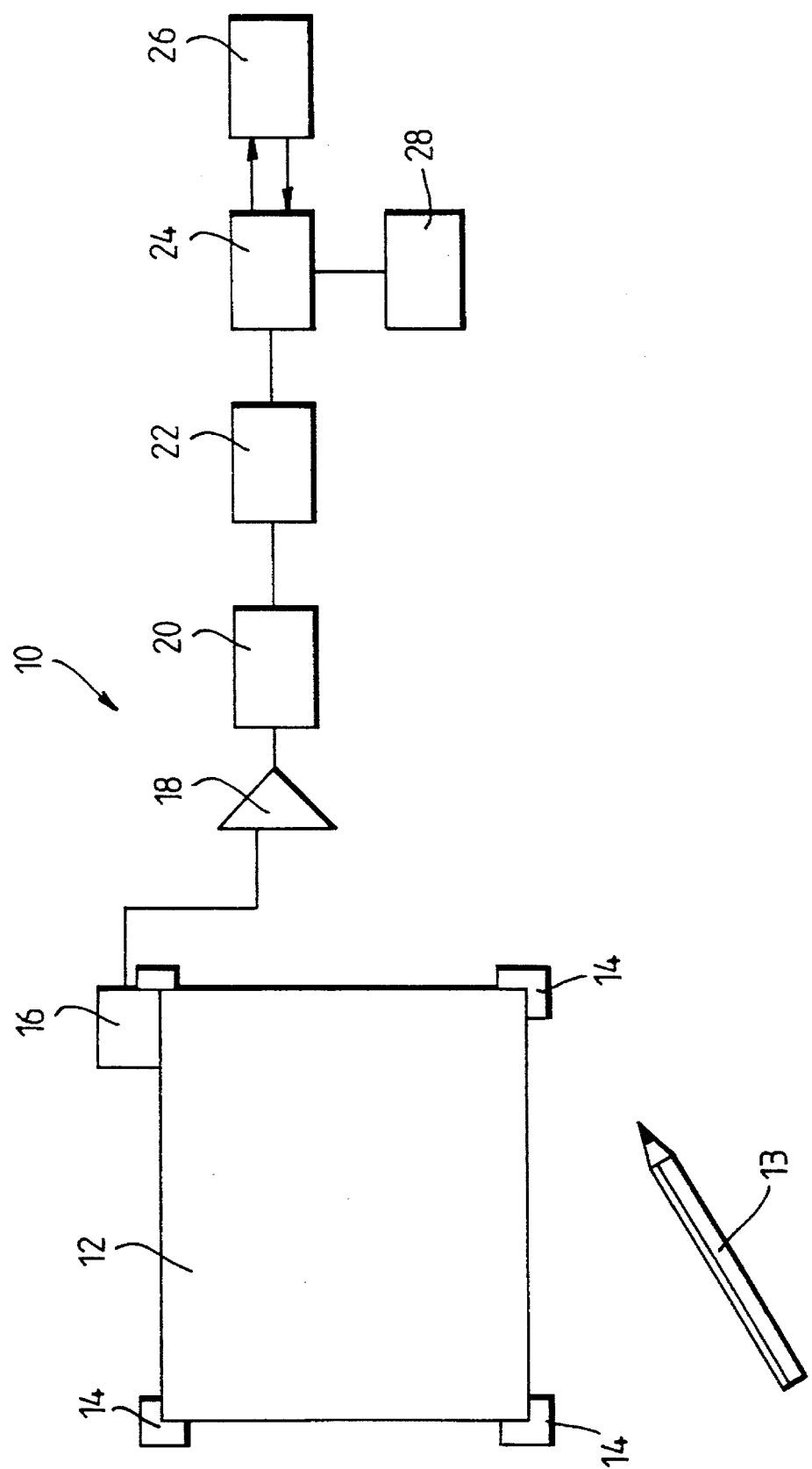
FIG. 1 is a block diagram of an apparatus in accordance with the present invention.

An apparatus for verifying personal handwriting is shown in FIG. 1. An acoustically conductive plate 12 is mounted on isolating blocks 14 in order to acoustically isolate it from the surface upon which it is located. A conventional resonant acoustic emission transducer 16 is acoustically coupled to the plate 12 for the purpose of detecting stress wave activity associated with the plate 12. Such stress wave activity is produced by the generation of a piece of handwriting on a surface of the plate 12 using a writing instrument 13. A piece of paper or other similarly surfaced material may be present on the plate 12 to receive the piece of handwriting, or alternatively, the piece of handwriting may be written directly on the plate 12. The writing instrument 13 may be a pen, or a pencil, but other writing instruments may be used. The plate 12 may be steel. The essential requirement is that when the piece of handwriting is generated, the friction between them should be sufficient to produce detectable stress waves within the plate 12, and that the plate 12 is acoustically conductive.

The transducer 16 detects the stress wave activity within the plate 12 over a narrow band of frequencies around the resonant frequency of the transducer 16. The transducer 16 is selected to have a resonant frequency which is well above audio frequencies so that substantially only stress wave activity produced by the interaction between the writing instrument 13 and the writing surface on the plate 12 is detected by the transducer 16.

The transducer 16 converts the detected stress wave activity into an electrical signal. This electrical signal is supplied in series to an amplifier 18, which amplifies the electrical signal and to a root mean square converter 20, which demodulates the electrical signal to an envelope of the stress wave activity associated with the generation of the piece of handwriting. The bandwidth, dynamic range and duration of this envelope are suitably limited to those values which are relevant to and characteristic of the particular piece of handwriting under investigation.

The output of the root mean square converter 20 is fed to an analogue to digital converter 22 which produces a digitised time record of the stress wave activity produced by the generation of the piece of handwriting. The digitised time record of the stress wave activity is supplied to a processing unit 24.

Figure 2:
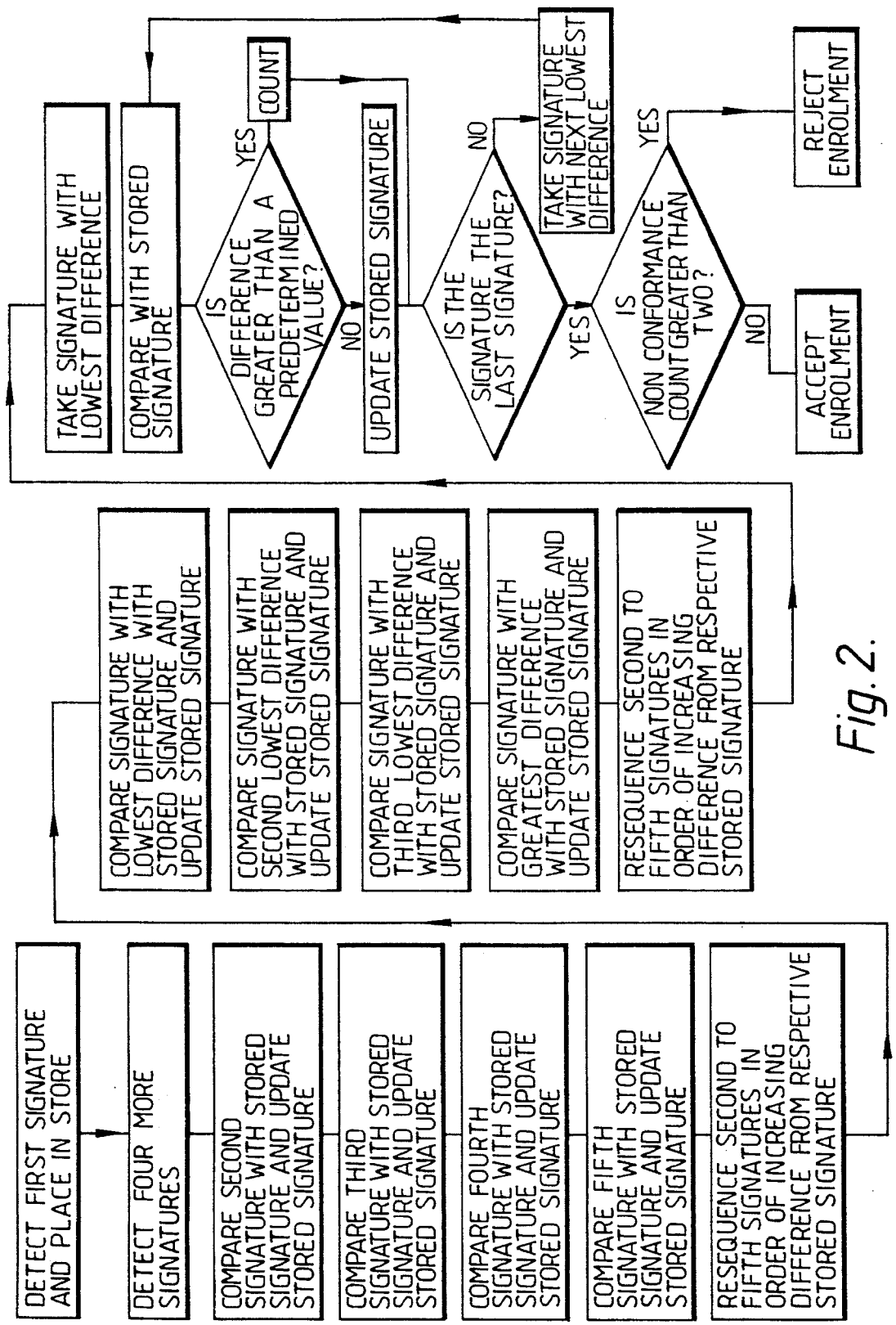
FIG. 2 is a flow chart showing the production of a stored time varying characteristic for use in the apparatus shown in FIG. 1.

If an author of a piece of handwriting has not previously used the apparatus, the author is required to enroll onto the apparatus. The enrollment procedure is shown in the form of a flow chart in FIG. 2. In the enrollment procedure the author is required to generate the piece of handwriting for a first time. The digitised time record of the stress wave activity produced during the first generation of the authentic piece of handwriting is supplied to a store 26. The author is then required to produce the piece of handwriting at least a further two times, preferably a further four times. The digitised time records of the stress wave activity produced during each of the at least two further generations of the piece of handwriting are used to update the stored digitised time record to store 26.

The processing unit 24 compares the stored digitised time record of the stress wave activity of the first generation of the piece of handwriting and the digitised time record of the stress wave activity of the second generation of the piece of handwriting and gives an indication of the degree of conformity between them. The comparison procedure involves using a dynamic time warping algorithm which takes a point, or portion, of the stored digitised time record of the stress wave activity of the first generation of the piece of handwriting and compares it with the digitised time record of the stress wave activity of the second generation of the piece of handwriting. The digitised time record of the stress wave activity of the second generation of the piece of handwriting is displaced in time relative to the stored digitised time record of the first generation of the piece of handwriting through different time periods, to obtain many better matches, and the best match is selected i.e. the match with least errors. Subsequent points, or portions, of the stored digitised time record of the stress wave activity of the first generation of the piece of handwriting are then compared with the digitised time record of the stress wave activity of the second generation of the piece of handwriting in a similar fashion to obtain best matches.

The comparison of a point, or portion, of the stored digitised time record of the stress wave activity of the first generation of the piece of handwriting and the best match of the digitised time record of the stress wave activity of the second generation of the piece of handwriting involves taking a measurement of the difference in amplitude ofthe stress wave activities and squaring the difference, and taking a measure of the time displacement to obtain the best match. This is a running least squares method which gives an indication of the errors between the two digitised time records of the stress wave activity of the first and second generations of the piece of handwriting The total error for the best match for each point, or portion, of the stored digitised time record of the stress wave activity of the first generation of the piece of handwriting is the sum of the square of the amplitude error and the time distortion errors. The total error for the best match of all the points, or portions, of the stored digitised time record of the stress wave activity of the first generation of the piece of handwriting is the sum of all the squares of the amplitude errors and all the time distortion errors. The total error, or differences, between the digitised time record of the stress wave activity of the second generation of the piece of handwriting and the stored digitised time record of the stress wave activity of the first generation of the piece of handwriting is stored.

The processing unit 24 stores the values of time displacement required to distort the digitised time record of the stress wave activity of the second generation of the piece of handwriting piece to a best match position with the stored digitised time record of the stress wave activity of the first generation of the piece of handwriting for each point, or portion, of the stored digitised time record of the stress wave activity of the first generation of the piece of handwriting. The time displacement values are stored in a back pointer array.

The stored digitised time record of the stress wave activity of the first generation of the piece of handwriting is replaced by a weighted average of the stored digitised time record of the stress wave activity of the first generation of the piece of handwriting and the digitised time record of the stress wave activity of the second generation of the piece of handwriting. The weighted average of the two digitised time records includes a weighted average of the amplitudes and a weighted average of the times of events. In order to produce the weighted average of the stored digitised time record of the stress wave activity of the first generation of the piece of handwriting and the digitised time record of the stress wave activity of the second generation of the piece of handwriting, the time displacement values stored in the backpointer array are again used to distort the digitised time record of the stress wave activity of the second generation of the piece of handwriting to the best fit time scale with the stored digitised time record of the stress wave activity of the first generation of the piece of handwriting.

The weighted average of each point on the stored digitised time record of the stress wave activity of the first generation of the piece of handwriting and the time warped digitised time record of the stress wave activity of the second generation of the piece of handwriting are then calculated to give a weighted average amplitude of the two digitised time records.

The weighted average of times of events is produced by displacing each new stress wave amplitude in value in time towards that of the digitised time record of the stress wave activity of the second generation of the piece of handwriting, the time displacement is weighted by the same value as that used for the weighted average of the stress wave amplitudes. This new digitised time record of stress wave activity is stored in the store as a stored first average digitised time record of the stress wave activity of the piece of handwriting and replaces the original stored digitised time record of the stress wave activity of the first generation of the piece of handwriting.

The processing unit 24 compares the stored first average digitised time record of the stress wave activity of the handwriting piece and the digitised time record of the stress wave activity of the third generation of the handwriting piece and gives an indication of the degree of conformity between them. The comparison procedure involves using the dynamic time warping algorithm which makes a point, or portion, of the stored first average digitised time record of the stress wave activity of the handwriting piece and compares it with the digitised time record of the stress wave activity of the third generation of the handwriting piece. The digitised time record of the stress wave activity of the third generation of the handwriting piece is displaced in time relative to the stored first average digitised time record of the stress wave activity of the handwriting piece through different time periods, to obtain many better matches, and the best match is selected i.e. the match with least errors. Subsequent points, or portions, of the stored first average digitised time record of the stress wave activity of the handwriting piece are then compared with the digitised time record of the stress wave activity of the third generation of the handwriting piece in a similar fashion to obtain best matches.

The comparison of a point, or portion, of the stored first average digitised time record of the stress wave activity of the handwriting piece and the best match of the digitised time record of the stress wave activity of the third generation of the handwriting piece involves taking a measurement of the difference in amplitude of the stress wave activities and squaring the differences, and taking a measure of the time displacement to obtain the best match. This is a running least squares method which gives an indication of the errors between the stored first average digitised time record of the stress wave activity of the handwriting piece and the digitised time record of the stress wave activity of the third generation of the handwriting piece. The total error for the best match for each point, or portion, of the stored first average digitised time record of the stress wave activity of the handwriting piece is the sum of the square of the amplitude error and the time distortion errors. The total error for the best match of all the points, or portions, of the stored first average digitised time record of the stress wave activity of the handwriting piece is the sum of all the squares of the amplitude errors and all the time distortion errors. The total error, or difference, between the digitised time record of the stress wave activity of the third generation of the handwriting piece and the stored first average digitised time record of the stress wave activity of the handwriting piece is stored.

The processing unit 24 stores the values of time displacement required to distort the digitised time record of the stress wave activity of the third generation of the handwriting piece to a best match position with the stored first average digitised time record of the stress wave activity of the handwriting piece for each point, or portion, of the stored first average digitised time record of the stress wave activity of the handwriting piece. The time displacement values are stored in a back pointer array.

The stored first average digitised time record of the stress wave activity of the handwriting piece is replaced by a weighted average of the stored first average digitised time record of the stress wave activity of the handwriting piece and the digitised time record of the stress wave activity of the third generation of the handwriting piece. The weighted average of the two digitised time records includes a weighted average of the amplitudes and a weighted average of the times of events. In order to produce the weighted average of the stored first average digitised time record of the stress wave activity of the handwriting piece and the digitised time record ofthe stress wave activity of the third generation of the handwriting piece, the time displacement values stored in the backpointer array are again used to distort the digitised time record of the stress wave activity of the third generation of the handwriting piece to the best fit time scale with the stored first average digitised time record of the stress wave activity of the handwriting piece.

The weighted average of each point on the stored first average digitised time record of the stress wave activity of the handwriting piece and the time warped digitised time record of the stress wave activity of the third generation of the piece of handwriting are then calculated to give a weighted average amplitude of the two digitised time records.

The weighted average of times of events is produced by displacing each new stress wave amplitude value in time towards that of the digitised time record of the stress wave activity of the third generation of the handwriting piece. the time displacement is weighted by the same value as that used for the weighted average of the stress wave amplitudes. This new digitised time record of stress wave activity is stored in the store as a stored second average digitised time record of the stress wave activity of the handwriting piece and replaces the stored first average digitised time record of the stress wave activity of the handwriting piece.

The processing unit 24 compares the stored second average digitised time record of the stress wave activity of the handwriting piece and the digitised time record of the stress wave activity of the fourth generation of the handwriting piece and gives an indication of the degree of conformity between them. The comparison procedure again involves using the dynamic time warping algorithm. The total error, or difference, between the digitised time record of the stress wave activity of the fourth generation of the handwriting piece and the stored second average digitised time record of the stress wave activity of the handwriting is stored.

The processing unit 24 stores the values of time displacement required to distort the digitised time record of the stress wave activity of the fourth generation of the handwriting piece to a best match position with the stored second average digitised time record of the stress wave activity of the handwriting piece for each point, or portion, of the stored second average digitised time record of the stress wave activity of the handwriting piece in a back pointer array. The stored second average digitised time record of the stress wave activity of the handwriting piece is replaced by a weighted average of the stored second average digitised time record of the stress wave activity of the handwriting piece and the digitised time record of the stress wave activity of the fourth generation of the handwriting piece. The weighted average of the two digitised time records includes a weighted average of the amplitudes and a weighted average of the times of events and is produced in the same manner as disclosed above. This new digitised time record of stress wave activity is stored in the store as a stored third digitised time record of the stress wave activity of the handwriting piece and replaces the stored second average digitised time record of the stress wave activity of the handwriting piece.

The processing unit 24 compares the stored third average digitised time record of the stress wave activity of the handwriting piece and the digitised time record of the stress wave activity of the fifth generation of the handwriting piece and gives an indication of the degree of conformity between them. The comparison procedure again uses the dynamic time warping algorithm. The total error, or difference, between the digitised time record of the stress wave activity of the fifth generation of the handwriting piece and the stored third average digitised time record of the stress wave activity of the handwriting piece is stored.

The processing unit 24 stores the values of time displacement required to distort the digitised time record of the stress wave activity of the fifth generation of the handwriting piece to a best match position with the stored third average digitised time record of the stress wave activity of the handwriting piece for each point, or portion, of the stored third average digitised time record of the stress wave activity of the handwriting piece in a back pointer array.

The stored third average digitised time record of the stress wave activity of the handwriting piece is replaced by a weighted average of the stored third average digitised time record of the stress wave activity of the handwriting piece and the digitised time record of the stress wave activity of the fifth generation of the handwriting piece. The weighted average of the two digitised time records includes a weighted average of the amplitudes and a weighted average of the times of events and is produced in the same manner as disclosed previously. This new digitised time record of stress wave activity is stored in the store as a stored fourth average digitised time record of the stress wave activity of the handwriting piece and replaces the stored third average digitised time record of the stress wave activity of the handwriting piece.

It can be seen that the procedure up to now differs from that disclosed in our European Patent Application No. 90313505.1 in that the digitised time records of the stress wave activity for the second, third, fourth and fifth generations of the handwriting piece have each been used once to update the stored digitised time record of the stress wave activity produced during the generation of an authentic handwriting piece no matter how great the difference between the stored digitised time record and the digitised time record of the particular handwriting piece.

The digitised time records of the stress wave activity for the second, third, fourth and fifth generations of the handwriting piece are resequenced in order of increasing error or difference, from the particular stored digitised time record of the stress wave activity of the handwriting piece with which it was compared. For example the digitised time record of the stress wave activity of the third generation of the handwriting piece was compared with the stored first average digitised time record of the stress wave activity of the handwriting piece. Similarly the digitised time record of the stress wave activity of the fifth generation of the handwriting piece was compared with the stored third average digitised time record of the stress wave activity of the handwriting piece.

The processing unit 24 compares the stored fourth average digitised time record of the stress wave activity of the handwriting piece and the digitised time record of the stress wave activity of the one, of the second, third, fourth and fifth generations of the handwriting piece, which has the least error and gives an indication of the degree of conformity between them using the same method as described previously.

The stored fourth average digitised time record of the stress wave activity of the handwriting piece is replaced by a weighted average of the stored fourth average digitised time record of the stress wave activity of the handwriting piece and the digitised time record of the stress wave activity of the one of the second third, fourth and fifth generations of the handwriting piece which has the least error. The weighted average of the two digitised time records includes a weighted average of the amplitudes and a weighted average of the times of events and is produced in the same manner as disclosed previously. This new digitised time record of stress wave activity is stored in the store as a stored fifth average digitised time record of the stress wave activity of the handwriting piece and replaces the stored fourth average digitised time record of the stress wave activity of the handwriting piece.

The processing unit 24 compares the stored fifth average digitised time record of the stress wave activity of the handwriting piece and the digitised time record of the stress wave activity of the one, of the second, third, fourth and fifth generations of the handwriting piece, which has the second lowest error and gives an indication of the degree of conformity between them using the same method as described previously.

The stored fifth average digitised time record of the stress wave activity of the handwriting piece is replaced by a weighted average of the stored fifth average digitised time record of the stress wave activity of the handwriting piece and the digitised time record of the stress wave activity of the one of the second third, fourth and fifth generations of the handwriting piece which has the second lowest error. The weighted average of the two digitised time records includes a weighted average of the amplitudes and a weighted average of the times of events and is produced in the same manner as discussed above. This new digitised time record of stress wave activity is stored in the store as a stored sixth average digitised time record of the stress wave activity of the handwriting piece and replaces the stored fifth average digitised time record of the stress wave activity of the handwriting piece.

The processing unit 24 compares the stored sixth average digitised time record of the stress wave activity of the handwriting piece and the digitised time record of the stress wave activity of the one, of the second, third, fourth and fifth generations of the handwriting piece, which has the third lowest error and gives an indication of the degree of conformity between them using the same method as described previously.

The stored sixth average digitised time record of the stress wave activity of the handwriting piece is replaced by a weighted average of the stored sixth average digitised time record of the stress wave activity of the handwriting piece and the digitised time record of the stress wave activity of the one of the second third, fourth and fifth generations of the handwriting piece which has the third lowest error. The weighted average of the two digitised time records includes a weighted average of the amplitudes and a weighted average of the times of events and is produced in the same manner as disclosed above. This new digitised time record of stress wave activity is stored in the store as a stored seventh average digitised time record of the stress wave activity of the handwriting piece and replaces the stored sixth average digitised time record of the stress wave activity of the handwriting piece.

The processing unit 24 compares the stored seventh average digitised time record of the stress wave activity of the handwriting piece and the digitised time record of the stress wave activity of the one, of the second, third, fourth and fifth generations of the handwriting piece, which has the greatest error and gives an indication of the degree of conformity between them using the same method as described previously.

The stored seventh average digitised time record of the stress wave activity of the handwriting piece is replaced by a weighted average of the stored seventh average digitised time record of the stress wave activity of the handwriting piece and the digitised time record of the stress wave activity of the one of the second third, fourth and fifth generations of the handwriting piece which has the greatest error. The weighted average of the two digitised time records includes a weighted average of the amplitudes and a weighted average of the times of events and is produced in the same manner as discussed previously. This new digitised time record of stress wave activity is stored in the store as a stored eighth average digitised time record of the stress wave activity of the handwriting piece and replaces the stored seventh average digitised time record of the stress wave activity of the handwriting piece.

The digitised time records of the stress wave activity for the second, third, fourth and fifth generations of the handwriting piece have each been used a second time to update the stored digitised time record of the stress wave activity produced during the generation of an authentic handwriting piece no matter how great the difference between the stored digitised time record and the digitised time record of the particular handwriting piece.

The digitised time records of the stress wave activity for the second, third, fourth and fifth generations of the handwriting piece are again resequenced in order of increasing error, or difference, from the particular stored digitised time record of the stress wave activity of the handwriting piece with which it was compared during the second updating of the stored digitised time record.

The processing unit 24 compares the stored eighth average digitised time record of the stress wave activity of the handwriting piece and the digitised time record of the stress wave activity of the one, of the second, third, fourth and fifth generations of the handwriting piece, which has the lowest error to give an indication of the degree of conformity between them using the same method as described previously.

If the total error is less than a predetermined value the digitised time record of the one, of the second, third, fourth and fifth generations of the handwriting piece, which has the lowest error has a good degree of conformity with the stored eighth average digitised time record of the stress wave activity of the handwriting piece.

The stored eighth average digitised time record of the stress wave activity of the handwriting piece is replaced by a weighted average of the stored eighth average digitised time record of the stress wave activity of the handwriting piece and the digitised time record of the stress wave activity of the one of the second third, fourth and fifth generations of the handwriting piece which has the lowest error if the total error is less than the predetermined value. A new digitised time record of stress wave activity is stored in the store as a stored ninth average digitised time record of the stress wave activity of the handwriting piece and replaces the stored eighth average digitised time record of the stress wave activity of the handwriting piece.

If the total error is equal to or greater than the predetermined value the digitised time record of the one of the second, third, fourth and fifth generations of the handwriting piece, which has the lowest error is not in conformity with the stored eighth average digitised time record of the stress wave activity of the handwriting piece.

The stored eighth average digitised time record of the stress wave activity of the handwriting piece is not updated by the digitised time record of the stress wave activity of the one of the second, third, fourth and fifth generations of the handwriting piece which has the lowest error if the total error is equal to or greater than the predetermined value.

The processing unit 24 compares either the stored eighth or ninth average digitised time record of the stress wave activity of the handwriting piece and the digitised time record of the stress wave activity of the one, of the second, third, fourth and fifth generations of the handwriting piece, which has the second lowest error and gives an indication of the degree of conformity between them using the same method as described previously.

If the total error is less than a predetermined value the digitised time record of the one, of the second, third, fourth and fifth generations of the handwriting piece, which has the second lowest error has a good degree of conformity with the stored eighth or ninth average digitised time record of the stress wave activity of the handwriting piece.

The stored eighth or ninth average digitised time record of the stress wave activity of the handwriting piece is replaced by a weighted average of the stored eighth or ninth average digitised time record of the stress wave activity of the handwriting piece and the digitised time record of the stress wave activity of the one of the second third, fourth and fifth generations of the handwriting piece which has the second lowest error if the total error is less than the predetermined value. A new digitised time record of stress wave activity is stored in the store as a stored ninth or tenth average digitised time record of the stress wave activity of the handwriting piece and replaces the stored eighth or ninth average digitised time record of the stress wave activity of the handwriting piece.

If the total error is equal to or greater than the predetermined value the digitised time record of the one of the second, third, fourth and fifth generations of the handwriting piece, which has the second lowest error is not in conformity with the stored eighth or ninth average digitised time record of the stress wave activity of the handwriting piece.

The stored eighth or ninth average digitised time record of the stress wave activity of the handwriting piece is not updated by the digitised time record of the stress wave activity of the one of the second, third, fourth and fifth generations of the handwriting piece which has the second lowest error if the total error is equal to or greater than the predetermined value.

The processing unit 24 compares either the stored eighth, ninth or tenth average digitised time record of the stress wave activity of the handwriting piece and the digitised time record of the stress wave activity of the one, of the second, third, fourth and fifth generations of the handwriting piece, which has the third lowest error and gives an indication of the degree of conformity between them using the same method as described previously.

If the total error is less than a predetermined value the digitised time record of the one, of the second, third, fourth and fifth generations of the handwriting piece, which has the third lowest error has a good degree of conformity with the stored eighth, ninth or tenth average digitised time record of the stress wave activity of the handwriting piece.

The stored eighth, ninth or tenth average digitised time record of the stress wave activity of the handwriting piece is replaced by a weighted average of the stored eighth, ninth or tenth average digitised time record of the stress wave activity of the handwriting piece and the digitised time record of the stress wave activity of the one of the second third, fourth and fifth generations of the handwriting piece which has the third lowest error if the total error is less than the predetermined value. A new digitised time record of stress wave activity is stored in the store as a stored ninth, tenth or eleventh average digitised time record of the stress wave activity of the handwriting piece and replaces the stored eighth, ninth or tenth average digitised time record of the stress wave activity of the handwriting piece.

If the total error is equal to or greater than the predetermined value the digitised time record of the one of the second, third, fourth and fifth generations of the handwriting piece, which has the third lowest error is not in conformity with the stored eighth, ninth or tenth average digitised time record of the stress wave activity of the handwriting piece.

The stored eighth, ninth, tenth or eleventh average digitised time record of the stress wave activity of the handwriting piece is not updated by the digitised time record of the stress wave activity of the one of the second, third, fourth and fifth generations of the handwriting piece which has the third lowest error if the total error is equal to or greater than the predetermined value.

The processing unit 24 compares either the stored eighth, ninth, tenth or eleventh average digitised time record of the stress wave activity of the handwriting piece and the digitised time record of the stress wave activity of the one, of the second, third, fourth and fifth generations of the handwriting piece, which has the greatest error and gives an indication of the degree of conformity between them using the same method as described previously.

If the total error is less than a predetermined value the digitised time record of the one, of the second, third, fourth and fifth generations of the handwriting piece, which has the greatest error has a good degree of conformity with the stored eighth, ninth, tenth or eleventh average digitised time record of the stress wave activity of the handwriting piece.

The stored eighth, ninth, tenth or eleventh average digitised time record of the stress wave activity of the handwriting piece is replaced by a weighted average of the stored eighth, ninth, tenth or eleventh average digitised time record of the stress wave activity of the handwriting piece and the digitised time record of the stress wave activity of the one of the second third, fourth and fifth generations of the handwriting piece which has the greatest error if the total error is less than the predetermined value. A new digitised time record of stress wave activity is stored in the store as a stored ninth, tenth, eleventh or twelfth average digitised time record of the stress wave activity of the handwriting piece and replaces the stored eighth, ninth, tenth or eleventh average digitised time record of the stress wave activity of the handwriting piece.

If the total error is equal to or greater than the predetermined value the digitised time record of the one of the second, third, fourth and fifth generations of the handwriting piece, which has the greatest error is not in conformity with the stored eighth, ninth, tenth or eleventh average digitised time record of the stress wave activity of the handwriting piece.

The stored eighth, ninth, tenth or eleventh average digitised time record of the stress wave activity of the handwriting piece is not updated by the digitised time record of the stress wave activity of the one of the second, third, fourth and fifth generations of the handwriting piece which has the greatest error if the total error is equal to or greater than the predetermined value.

The digitised time records of the stress wave activity for the second, third, fourth and fifth generations of the handwriting piece are each used a third time to update the stored digitised time record of the stress wave activity produced during the generation of an authentic handwriting piece if the difference between the stored digitised time record and the digitised time record of the particular handwriting piece is less than the predetermined value.

If any two of the second, third, fourth and fifth generations of the handwriting piece result have digitised time records of stress wave activity which have differences from the stored digitised time record greater than the predetermined value, the enrollment procedure is aborted and the whole procedure is repeated. The final stored digitised time record of the stress wave activity of the handwriting piece is a better average of the digitised time records of the several generations of the handwriting piece. Any poor, or untypical, samples of the generation of the handwriting piece made during the enrollment procedure are rejected when the stored digitised time record is updated a third time by the digitised time records of each of the handwriting piece.

When the digitised time record of the stress wave activity of a subsequent authentic generation of the piece of handwriting is compared with the final stored digitised time record, produced during the enrollment procedure, the subsequent authentic generation of the handwriting piece is not determined to be a forgery.

Alternatively if an author of a handwriting piece has not previously used the apparatus, the author is required to enroll onto the apparatus. In the enrollment procedure random noise is supplied to a store 26. The author is required to produce a handwriting piece at least two times, preferably four times. The digitised time records of the stress wave activity produced during each of the at least two generations of the handwriting piece are used to update the stored digitised time record in store 26.

The same procedure of comparing the digitised time records of the stress wave activity of each generation of the handwriting piece sequentially with the stored digitised time record is followed as discussed before.

A suitable weighting factor used during the procedure is four times the stored digitised time record to one times the digitised time record being compared to the stored digitised time record.

Although the description has referred to the use of stress wave activity as the time varying characteristic, other suitable time varying characteristics may be used. One example is the use of a load cell to detect the force, load or pressure applied on the writing instrument, or body, during the generation of the piece of handwriting. A further example is the use of a capacitor to detect the capacitance defined between the writing instrument and the surface of the body. Other suitable time varying characteristics derived from the dynamics of the production of a piece of handwriting are position, velocity and acceleration.

I claim:

1. A method of generating a weighted average of a time varying characteristic of handwriting of an individual in a handwriting verification process comprising the steps of detecting a time varying characteristic produced by the motion of a writing instrument on a surface of a body during the generation of a given piece of handwriting, storing random noise or the time varying characteristic produced by the motion of the writing instrument on the surface of the body during a first generation of the piece of handwriting by an author at an enrollment procedure to produce a stored time varying characteristic A, sequentially producing a weighted average B of A and the time varying characteristic C produced by the motion of the writing instrument on the surface of the body during each one of a plurality of subsequent generations of the piece of handwriting by the author at said enrollment procedure and replacing A with B and the time varying characteristic produced by the motion of the writing instrument on the surface of the body during the said one of the subsequent generations of the piece of handwriting by the author at the enrollment procedure, wherein sequentially producing a weighted average includes comparing A and the time varying characteristic produced by the motion of the writing instrument on the surface of the body during each one of the plurality of subsequent generations of the piece of handwriting by the author at the enrollment procedure to give a measure of the difference, resequencing A of each of the plurality of subsequent generations of the piece of handwriting by the author at the enrollment procedure in order of increasing difference from the respective stored time varying characteristic A, sequentially producing a weighted average of A and the time varying characteristic produced by the motion of the writing instrument on the surface of the body for each of the resequenced plurality of subsequent generations of the piece of handwriting by the author at the enrollment procedure and replacing A with the average of A and the time varying characteristic produced by the motion of the writing instrument on the surface of the body during said one subsequent generation of the piece of handwriting by the author at the enrollment procedure if the difference is less than a predetermined value to produce a better average of the time varying characteristics produced by the motion of the writing instrument on the surface of the body from the subsequent generations of the piece of handwriting by the author at the enrollment procedure in which, after resequencing the time varying characteristic of the plurality of subsequent generations of the piece of handwriting and before sequentially producing and storing the weighted average of A and B produced by the motion of the writing instrument on the surface of the body for each one of the subsequent generations of the handwriting piece if the difference is less than a predetermined value, sequentially producing another weighted average D of the stored time varying characteristic and the time varying characteristic produced by the motion of the writing instrument on the surface of the body during each one of the plurality of subsequent generations of the piece of handwriting by the author at said enrollment procedure and replacing the stored time varying characteristic with D, resequencing the time varying characteristic of each of the plurality of subsequent generations of the piece of handwriting by the author at the enrollment procedure in order of increasing difference from the respective stored time varying characteristic to provide a reference average of a time varying characteristic of handwriting for use in a handwriting verification process.

2. A method as claimed in claim 1 further comprising the step of determining if a predetermined number of the plurality of subsequent generations of the piece of handwriting have a difference from the stored time varying characteristic equal to or greater than the predetermined value and aborting the enrollment procedure if the predetermined number is equalled or exceeded.

3. A method as claimed in claim 1 in which the comparing of the stored time varying characteristic with the time varying characteristic produced by the motion of the writing instrument on the surface of the body includes distorting the time varying characteristic in time to obtain a best match with the stored time varying characteristic and storing the value of time distortion required to obtain the best match.

4. A method as claimed in claim 3 in which producing a weighted average of the stored time varying characteristic and the time varying characteristic produced by the motion of the writing instrument on the surface of the body includes distorting the time varying characteristic in time by the values stored to obtain the best match with the stored time varying characteristic, producing weighted average magnitudes of the time varying characteristic between the stored time varying characteristic and the time distorted time varying characteristic produced by the motion of the writing instrument on the surface of the body and producing weighted average of time of events by displacing the weighted average magnitudes of the time varying characteristic in time towards the time varying characteristic produced by the motion of the writing instrument on the surface of the body.

5. A method as claimed in claim 1 in which the time varying characteristic is stress wave activity.

6. A method as claimed in claim 1 in which the time varying characteristic is capacitance.

7. A method as claimed in claim 1 in which the time varying characteristic is load or pressure.

8. A method as claimed in claim 1 in which the time varying characteristic is velocity.

9. A method as claimed in claim 1 in which the varying characteristic is acceleration.

10. An apparatus (10) for generation of a weighted average of a time varying characteristic of handwriting of an individual in a handwriting verification process comprising means (16) for detecting a time varying characteristic produced by the motion of a writing instrument (13) on a surface of a body (12) during the generation of a given piece of handwriting, means (26) for storing random noise or the time varying characteristic produced by the motion of the writing instrument (13) on the surface of the body (12) during the first generation of the piece of handwriting by an author at an enrollment procedure to produce a stored time varying characteristic A, means (24) for sequentially producing a weighted average B of A and the time varying characteristic C produced by the motion of the writing instrument on the surface of the body during each one of a plurality of subsequent generations of the piece of handwriting by the author at said enrollment procedure and for replacing A with B and the time varying characteristic produced by the motion of the writing instrument on the surface of the body during the said one of the subsequent generations of the piece of handwriting by the author at the enrollment procedure, characterised in that the means (24) for sequentially producing a weighted average includes means for comparing A and the time varying characteristic produced by the motion of the writing instrument on the surface of the body during each one of the plurality of subsequent generations of the piece of handwriting by the author at the enrollment procedure to give a measure of the difference, means (24) for resequencing the time varying characteristic of each of the plurality of subsequent generations of the piece of handwriting by the author at the enrollment procedure in order of increasing difference from the respective stored time varying characteristic, second means (24) for sequentially producing another weighted average of the stored time varying characteristic and the time varying characteristic produced by the motion of the writing instrument on the surface of the body for each of the resequenced plurality of subsequent generations of the piece of handwriting by the author at the enrollment procedure and replacing the stored time varying characteristic with the average of the stored time varying characteristic and the time varying characteristic produced by the motion of the writing instrument on the surface of the body during said one subsequent generation of the piece of handwriting by the author at the enrollment procedure if the difference is less than a predetermined value to produce an average D of the time varying characteristic produced by the motion of the writing instrument on the surface of the body from the subsequent generations of the piece of handwriting by the author at the enrollment procedure in which the apparatus comprises third means (24) for sequentially producing a weighted average of the stored time varying characteristic and the time varying characteristic produced by the motion of the writing instrument on the surface of the body for each one of the plurality of subsequent generations of the piece of handwriting by the author at said enrollment procedure resequenced by the means for resequencing the time varying characteristic of the plurality of subsequent generation of the piece of handwriting and replacing A with the weighted average of A and the time varying characteristic produced by the motion of the writing instrument on the surface of the body during the said one of the subsequent generations of the piece of handwriting by the author at the enrollment procedure, second means (24) for resequencing the time varying characteristic of each of the plurality of subsequent generations of the piece of handwriting by the author at the enrollment procedure in order of increasing difference from the respective stored time varying characteristic to produce a reference average of a time varying characteristic of handwriting for use in handwriting verification process.

11. An apparatus as claimed in claim 10 further comprising means (24) for determining if a predetermined number of the plurality of subsequent generations of the piece of handwriting have a difference from the stored time varying characteristic equal to or greater than the predetermined value and for aborting the enrollment procedure if the predetermined number is equalled or exceeded.

12. An apparatus as claimed in claim 10 in which the means (24) for comparing the stored time varying characteristic with the time varying characteristic produced by the motion of the writing instrument on the surface of the body distorts the time varying characteristic in time to obtain a best match with the stored time varying characteristic and stores the value of time distortion required to obtain the best match.

13. An apparatus as claimed in claim 12 in which the means (24) for producing a weighted average of the stored time varying characteristic and the time varying characteristic produced by the motion of the writing instrument on the surface of the body is arranged to distort the time varying characteristic in time by the values stored to obtain the best match with the stored time varying characteristic, and is arranged to produce weighted average magnitudes of the time varying characteristic between the stored time varying characteristic and the time distorted time varying characteristic produced by the motion of the writing instrument on the surface of the body and is arranged to produce a weighted average of time of events by displacing the weighted average magnitudes of the time varying characteristic in time towards the time varying characteristic produced by the motion of the writing instrument on the surface of the body.

14. An apparatus as claimed in claim 10 in which the means (16) for detecting the time varying characteristic is an acoustic emission transducer for detecting the stress wave activity produced by the motion of the writing instrument (13) on the surface of the body (12).

15. An apparatus as claimed in claim 10 in which the means for detecting the time varying characteristic is a capacitor defined between the writing instrument and the surface of the body, the time varying characteristic is capacitance.

16. An apparatus as claimed in claim 10 in which the means for detecting the time varying characteristic is a load cell for detecting load, or pressure, produced by the motion of the writing instrument on the surface of the body.

17. An apparatus as claimed in claim 14 in which the means (16) for detecting the stress wave activity comprises a resonant acoustic emission transducer.

* * * * *

UNITED STATES PATENT AND TRADEMARK OFFICE
CERTIFICATE OF CORRECTION

PATENT NO. : 5,479,531
DATED : December 26, 1995
INVENTOR(S) : Webster

It is certified that error appears in the above-indentified patent and that said Letters Patent is hereby corrected as shown below:

On the title page: Item [22]

PCT Filed: Apr. 28, 1991" should read

PCT Filed: Apr. 28, 1992--.

Signed and Sealed this

Sixteenth Day of April, 1996

Attest:

BRUCE LEHMAN

Attesting Officer     Commissioner of Patents and Trademarks